United States Patent Office 2,836,544
Patented May 27, 1958

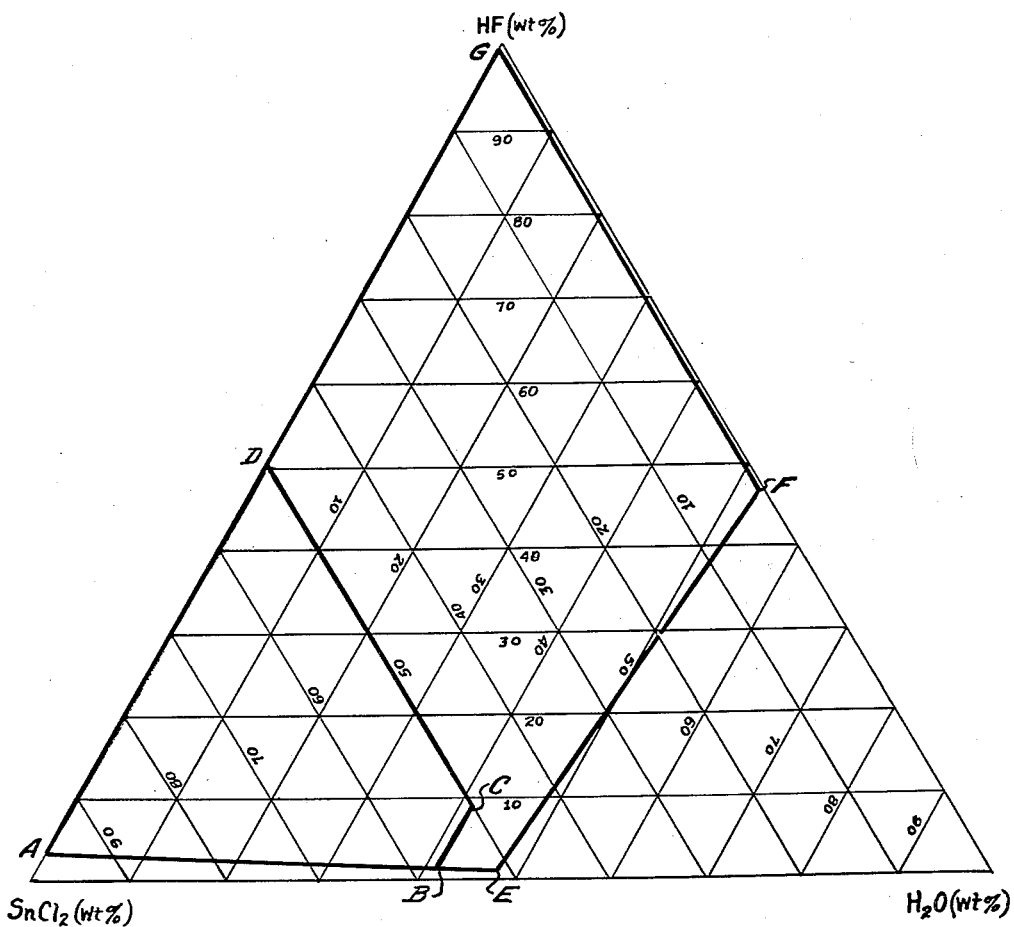

2,836,544

STANNOUS CHLOROFLUORIDE, METHOD OF PREPARING SAME, AND DENTIFRICE COMPOSITIONS THEREWITH

William H. Nebergall, Bloomington, Ind., assignor to Indiana University Foundation, Bloomington, Ind., a corporation of Indiana Application February 7, 1955, Serial No. 486,385

9 Claims. (Cl. 167—93)

This invention relates to a new composition of matter. More particularly, it relates to the compound tin (II) chlorofluoride (stannous chlorofluoride), having the formula SnClF ($SnCl_2 \cdot SnF_2$), to a method for its preparation, and to compositions of matter containing this compound. It further relates to compositions of matter suitable for application to the teeth.

Although it is commonly recognized that the introduction of small amounts of fluorine into drinking water has a pronounced effect in reducing the occurrence of dental caries, this method of providing fluorine is not feasible where drinking water is obtained from small private sources such as individual wells, etc. rather than from a common public source. Further, the addition of fluorine to common public sources is not always accepted or permitted.

Topical applications of aqueous fluoride solutions to an individual by a dentist provide an excellent measure of protection. However, such treatment is time consuming and expensive and, thus, is not always available to all persons desiring it. One of the most practicable methods of administering fluorine lies in the use of a dentifrice composition.

It has now been found that a new compound can be prepared, containing tin (II) and fluorine in combination with chlorine, which produces very satisfactory results in reducing dental caries when applied topically in aqueous solution or in a dentifrice.

The compound may be further used as a mordant in the dyeing of fabrics, in glass making and ceramics, in tin electroplating, and as an intermediate in the synthesis of organotin compounds.

Accordingly, one of the objects of this invention is to provide a method for preparing a new and novel compound.

A further object is to provide compositions of matter containing this compound.

Another object is to provide novel compositions of matter suitable for application to the teeth which will materially reduce the rate of formation of dental caries.

A further object is to provide dentifrice compositions which may be easily and safely used by humans, and which will significantly reduce the formation of dental caries.

Other objects and advantageous features will be obvious from the following detailed description and drawing in which the triangular diagram defines the compositions from which the compound and compositions of matter of this invention can be prepared.

Tin (II) chlorofluoride, forms needle-like crystals, which begin to decompose within a range of about 100 to 130° C. when heated.

In general, tin (II) chlorofluoride may be prepared by reacting hydrogen fluoride with tin (II) chloride. The reaction is facilitated by combining the materials in an aqueous solution. After reaction, crystals of the compound are formed. If the reaction takes place in an aqueous solution it may be necessary to cool or use other methods known in the art to form the crystals.

The preferred concentrations of components of the reaction mixture at the time of the start of the crystallization of the product are shown by the area ABCDA of the figure. The crystals formed from this range of materials will be substantially entirely crystals of tin (II) chlorofluoride.

Reaction of products within the broader range AEFGA will also produce tin (II) chlorofluoride. However, when crystallization occurs from a mixture outside the range area ABCDA a mixture comprising two compounds will be produced, tin (II) chlorofluoride and tin (II) monochlorotrifluoride. A mixture can be used as such for the purpose of this invention. However, if desired, these two materials can be separated by suitable methods obvious to those skilled in the art.

The tin (II) chloride used in the preparation of the compound may be either anhydrous or in the hydrate form. Also, the hydrogen fluoride may be supplied either as a gas or in aqueous solution as hydrofluoric acid. The reaction may take place in the absence of water. However, when water is present the total proportion of water, whether present as water of hydration or as solvent for the hydrogen fluoride or the reaction mixture must not exceed the limits as defined by the line EF of the figure.

The tin (II) chloride salt may be supplied to the reaction mixture either in salt form or in solution, so long as crystal formation takes place within the composition ranges as heretofore set forth. If solvents other than water are used they should be selected so as to introduce no undesirable reactant or contaminants.

The temperature at which the reaction takes place is not critical except that the application of heat may be desirable to dissolve the tin (II) chloride and thus hasten the reaction. Also, the use of a minimum amount of water in the solution will facilitate crystallization of the tin (II) chlorofluoride.

The tin (II) chloride may be formed in situ in the reaction mixture. For example, tin (II) oxide may be combined with hydrogen chloride. Also, tin may be directly combined with chlorine under proper reaction conditions. It is to be understood that any of the foregoing and other equivalent reactions are to be included in the scope of this invention.

Since stannous salts are easily oxidized it may be desirable to use oxygen-free water in preparing the aqueous solutions to prevent the formation of stannic salts which could form contaminating insoluble compounds. It may also be desirable to protect the reacting materials from the air by keeping them under some inert or reducing gas such as nitrogen, hydrogen, etc. However, since the contamination would be slight, these precautions will not be necessary where small amounts of impurities can be tolerated.

The following example illustrates the preparation of the compound with greater particularity:

*Example I*

112.8 g. (0.5 mole) tin (II) chloride dihydrate were weighed into a 200 ml. polyethylene beaker, and 15 g. of oxygen-free, boiling water were added to dissolve the salt. The solution was heated to 55° C. on a steam bath, while maintaining an atmosphere of oxygen-free nitrogen above the solution. 22.5 g. (0.55 mole) of 49.6% hydrofluoric acid were slowly added to the solution. The mixture was allowed to cool at room temperature, and colorless crystals formed. The supernatant liquid was decanted, and the crystals were washed three times with 95% ethanol; the alcohol was decanted after each washing. The product was dried in an evacuated desiccator over a 1:1 mixture of anhydrous calcium chloride and potassium hydroxide.

*Analysis.*—Calcd. for SnClF: Sn, 68.53%; F, 10.97%. Found: Sn, 68.7%, 68.3%, 68.5%; F, 10.7%, 10.7%, 10.8%.

Tin (II) chlorofluoride in aqueous solution is an excellent material for topical application to the teeth. The following example illustrates the efficacy of an aqueous solution in clinical testing.

Example II

An aqueous solution of 4% tin (II) chlorofluoride solution was prepared using oxygen-free water. This solution was applied to newly erupted teeth of nearly 400 children. As a comparison, a comparable group was treated with a 1% solution of sodium fluoride (this furnished an equivalent amount of fluoride).

The aqueous solutions were applied to the teeth by cotton applicators as described by J. W. Knutson, J. Amer. Dent. Assn., 36–37 (1948). This consisted of a thorough dental prophylaxis followed immediately by the first fluoride application. Within a period not exceeding 10 days, three additional treatments were given although only the first was preceded by a prophylaxis. The treatment consisted of keeping all surfaces of the teeth moist throughout each four minute treatment series. Approximately one year after the initial fluoride applications the children were reexamined by the same dentist. The following table shows the dental caries experience in the erupted permanent teeth at the time of the first examination:

| Solution | Number of Children | Initial Examination | | 12 Months Later | | Percent Reduction | |
|---|---|---|---|---|---|---|---|
| | | Non-Carious Teeth | Decayed, Missing or Filled Surfaces | New Decayed, Missing or Filled Teeth [1] | New Decayed, Missing or Filled Surfaces [1] | Teeth | Surfaces |
| NaF | 397 | 5,569 | 1,869 | 245 | 281 | 86.9 | 83.5 |
| SnClF | 394 | 5,409 | 1,846 | 32 | 46 | | |

[1] Compared to initial noncarious teeth.

As can be seen, the use of aqueous solutions of SnClF results in a very great reduction in caries formation as compared to aqueous solutions of NaF.

Very satisfactory results can be obtained using a concentration of from about 0.0091% SnClF up to saturation. However, aqueous solutions for topical application containing too large an amount of fluorine may be toxic if swallowed and must be used with care.

As has been heretofore pointed out, tin (II) chlorofluoride can be incorporated in a dentifrice composition, and will produce very good results in reduction of caries formation when applied to the teeth in this type of medium.

One of the most commonly used dentifrice forms is toothpaste, and tin (II) chlorofluoride can be conveniently included as an active material in a toothpaste.

Example III

Toothpaste, containing 4000 p. p. m. of F— was prepared having the following composition:

| | Percent |
|---|---|
| Sodium carboxymethylcellulose | 1.60 |
| Calcium pyrophosphate | 40.82 |
| Tin (II) chlorofluoride | 3.54 |
| Glycerine | 25.00 |
| Sodium coconut monoglyceride sulfonate | 1.00 |
| Lauryl alcohol sulfate | 0.38 |
| Flavor and sweetening | q. s. |
| Water | Balance |

Example IV

A toothpaste containing 1000 p. p. m. of F— was prepared having the following formula:

| | Percent |
|---|---|
| Sodium carboxymethylcellulose | 1.10 |
| Magnesium-aluminum silicate | 0.40 |
| Humectants | 30.00 |
| Calcium pyrophosphate | 40.00 |
| Tin (II) chlorofluoride | 0.91 |
| Sodium coconut monoglyceride sulfonate | 0.81 |
| Lauryl alcohol sulfate | 0.70 |
| Flavor and sweetening | q. s. |
| Water | Balance |

Although specific formulations have been given in the preceding examples for toothpastes, other equivalent materials may be used. For example, alumina is another very satisfactory abrasive. Other abrasives which will form satisfactory toothpastes, but which are less effective, include dicalcium phosphate, both hydrated and anhydrous, calcium carbonate, etc.

The preferred binder is one of the cellulose ether type such as sodium carboxymethyl cellulose, etc., but other known and acceptable binders may be used.

Any of the sudsing agents commonly used will be satisfactory for the toothpaste formulation. Examples of these include alkyl sulfates, monoglyceride sulfonates, alkyl sulfa-acetates, sarcosides, soaps, etc.

Other components of pastes such as humectants, such as glycerine, sorbitol, etc., flavorings such as oils of spearmint, peppermint or wintergreen, and sweetening agents will suggest themselves to those skilled in the art.

The compound of this invention may also be used in dental powders, which are conventionally blends of the active ingredient with the abrasives, flavoring and sweetening agents listed above.

Liquid dentifrices to be included within the scope of this invention can contain, in addition to the active agent, suitable sudsing agents, binders, humectants, flavoring and sweetening agents, selected from the list above.

Compositions for chewing gums would contain chicle, flavoring and sweetening materials as listed above.

The compound may also be included in dentifrices which may be dispensed from a pressurized container in the form of foam.

In dentifrice compositions it is preferred to use from 0.0091% to 3.64% of SnClF, while especially good results are obtained with a dentifrice containing from 0.22% to 0.91%.

While specific examples of dentifrice materials have been set forth it is to be understood that they are illustrative only and that the invention is not to be limited thereto.

What is claimed is:

1. Stannous chlorofluoride.
2. The method of making stannous chlorofluoride which comprises mixing $SnCl_2$, $H_2O$, and HF in proportions substantially defined by the area ABCDA of the figure, and forming stannous chlorofluoride from said mixture by crystallization.

3. The method of making a composition of matter containing stannous chlorofluoride which comprises mixing $SnCl_2$, $H_2O$ and HF in proportions substantially defined by the area AEFGA of the figure and forming a mixture of crystals of stannous chlorofluoride and distannous monochlorotrifluoride from said mixture by crystallization.

4. The method of making stannous chlorofluoride which comprises mixing $SnCl_2$, $H_2O$, and HF, in proportions substantially defined by the area AEFGA of the figure, forming a mixture of crystals of stannous chlorofluoride and distannous monochlorotrifluoride from said mixture by crystallization and separating out stannous chlorofluoride.

5. A composition of matter useful in the treatment of teeth comprising an aqueous solution containing stannous chlorofluoride.

6. A dentifrice containing stannous chlorofluoride.

7. A composition of matter useful in the treatment of teeth comprising an aqueous solution containing from 0.0091% to saturation of stannous chlorofluoride.

8. A toothpaste containing stannous chlorofluoride.

9. A toothpaste containing from 0.0091% to 3.64% stannous chlorofluoride.

References Cited in the file of this patent

UNITED STATES PATENTS

| | | |
|---|---|---|
| 1,943,856 | Cross | Jan. 16, 1934 |
| 2,689,170 | King | Sept. 14, 1954 |
| 2,694,616 | Wainer | Nov. 16, 1954 |
| 2,717,197 | Brown | Sept. 6, 1955 |

OTHER REFERENCES

Hoffman: Dictionary of the Inorganic Compounds, Leipzig, 1919, Band 1, No. 39, p. 1448 ($Sn_2F_2Cl_2$).